United States Patent [19]

Mountain

[11] 4,108,206
[45] Aug. 22, 1978

[54] HERMETICALLY SEALED FOUR-WAY VALVE

[76] Inventor: Donald C. Mountain, 2812 King Rd., North Kingsville, Ohio 44068

[21] Appl. No.: 718,988

[22] Filed: Aug. 30, 1976

[51] Int. Cl.² .................................................. F16K 11/10
[52] U.S. Cl. ............................... 137/596.17; 137/874; 137/875; 137/876
[58] Field of Search ................... 137/119, 596, 596.13, 137/596.17, 610, 612, 625.21, 625.44, 625.46, 874, 875, 876; 251/286

[56] References Cited

U.S. PATENT DOCUMENTS

| | | | |
|---|---|---|---|
| 2,518,574 | 8/1950 | Skopecek | 137/612 |
| 3,307,583 | 3/1967 | Harter | 137/596 |
| 3,949,774 | 4/1976 | Morrow | 137/610 X |

*Primary Examiner*—Gerald A. Michalsky
*Attorney, Agent, or Firm*—Ralph Hammar

[57] ABSTRACT

This invention relates to an electromagnetically controlled four-way valve and has as an objective the creation of such a valve as to be exceptionally fast acting and fast cycling, while requiring comparatively little power or force to operate it, a valve that will be especially suited to high flow, low pressure applications, a valve of considerable capacity that does not require a smaller valve to pilot it, or a minimum line pressure and back pressure to actuate it, but does require a slight fluid flow, a valve that will have a low flow resistance factor, a valve that is hermetically sealed to the outside environment, a valve of simple construction (only two moving parts), a valve that is easily and inexpensively produced, a valve in which the application does not require a positive no leak shut-off to flow, but of which application does allow for a neutral position with all ports open, or will require no active neutral position at all—the neutral position only being passed through to make the other positions.

The unique character of the valve is made possible by the utilization of natural phenomena indigenous to fluid flow (using the power already in the controlled fluid to assist in control), by the minimization of mechanical resistances such as friction, mass of moving parts, and distance of stroke, and by the splitting of the actuating and hold-in functions.

14 Claims, 9 Drawing Figures

4,108,206

HERMETICALLY SEALED FOUR-WAY VALVE

DRAWING DESCRIPTION

Figure 1:
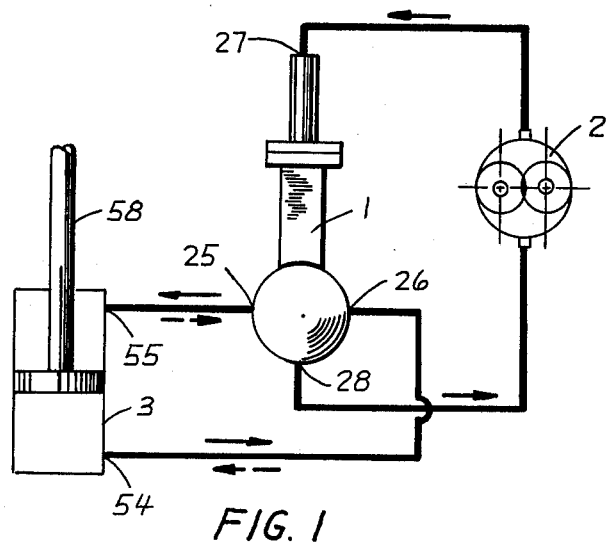

FIG. 1 shows the electromagnetically actuated four-way control valve 1 operating a piston 58 in cylinder 3 with the operating fluid supplied by pump 2. FIG. 1 depicts a common arrangement and use for said four-way valve.

Figure 2:
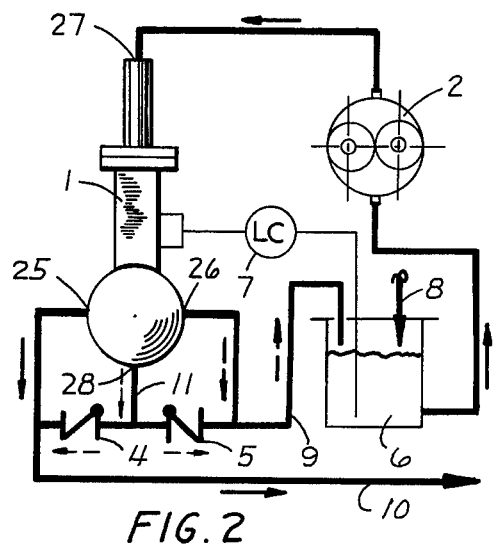

FIG. 2 shows the said valve 1 in three-way operation, in use controlling the tank 6 level with operating fluid supplied by pump 2 and control stimuli supplied by level controller 5. Tank level control is a familiar situation encountered in industry.

Figure 3:
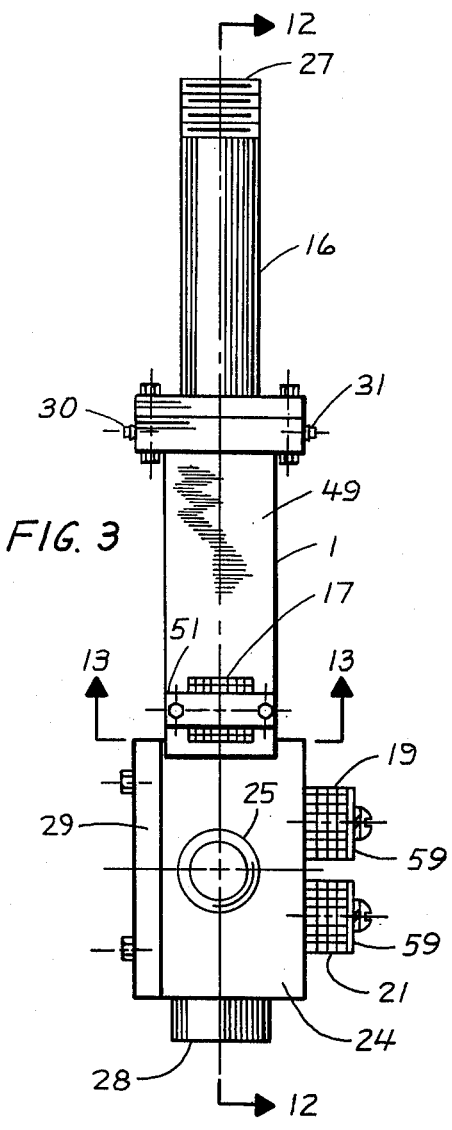

FIG. 3 is an assembly of the said valve 1 from the side view, with sections 12—12 and 13—13 showing important details.

Figure 4:
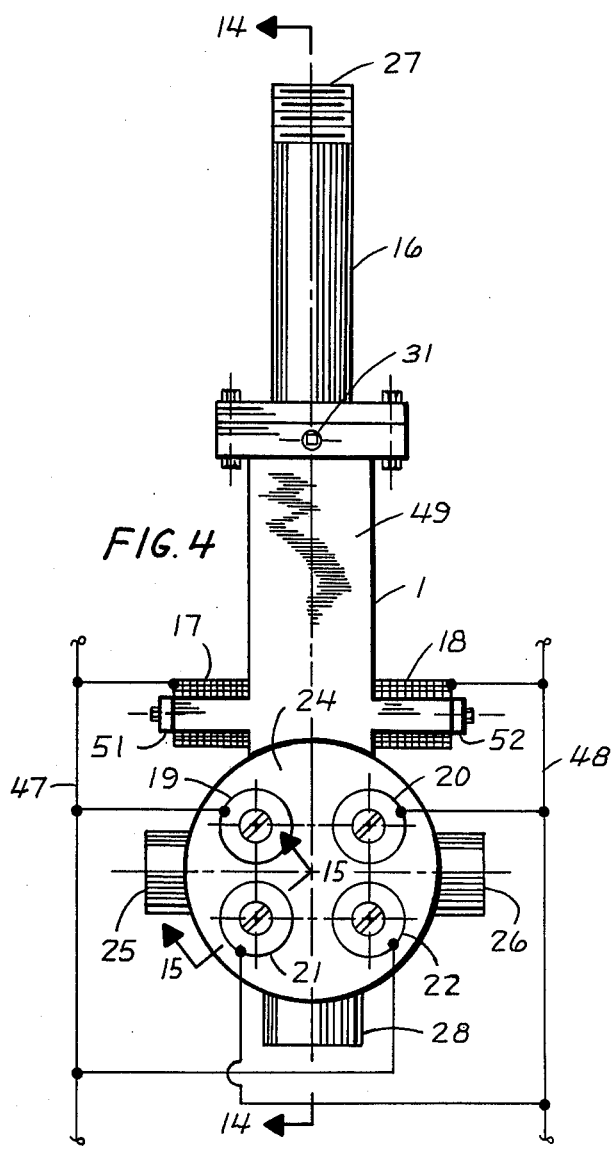

FIG. 4 is an assembly of the said valve 1 from the rear view, with the sections 14—14 and 15—15 showing important details. FIG. 4 shows the electrical control hook-up arrangement thru lines 47 and 48 to electromagnets 17,19,22 and 18,20,21 respectfully.

Figure 5:
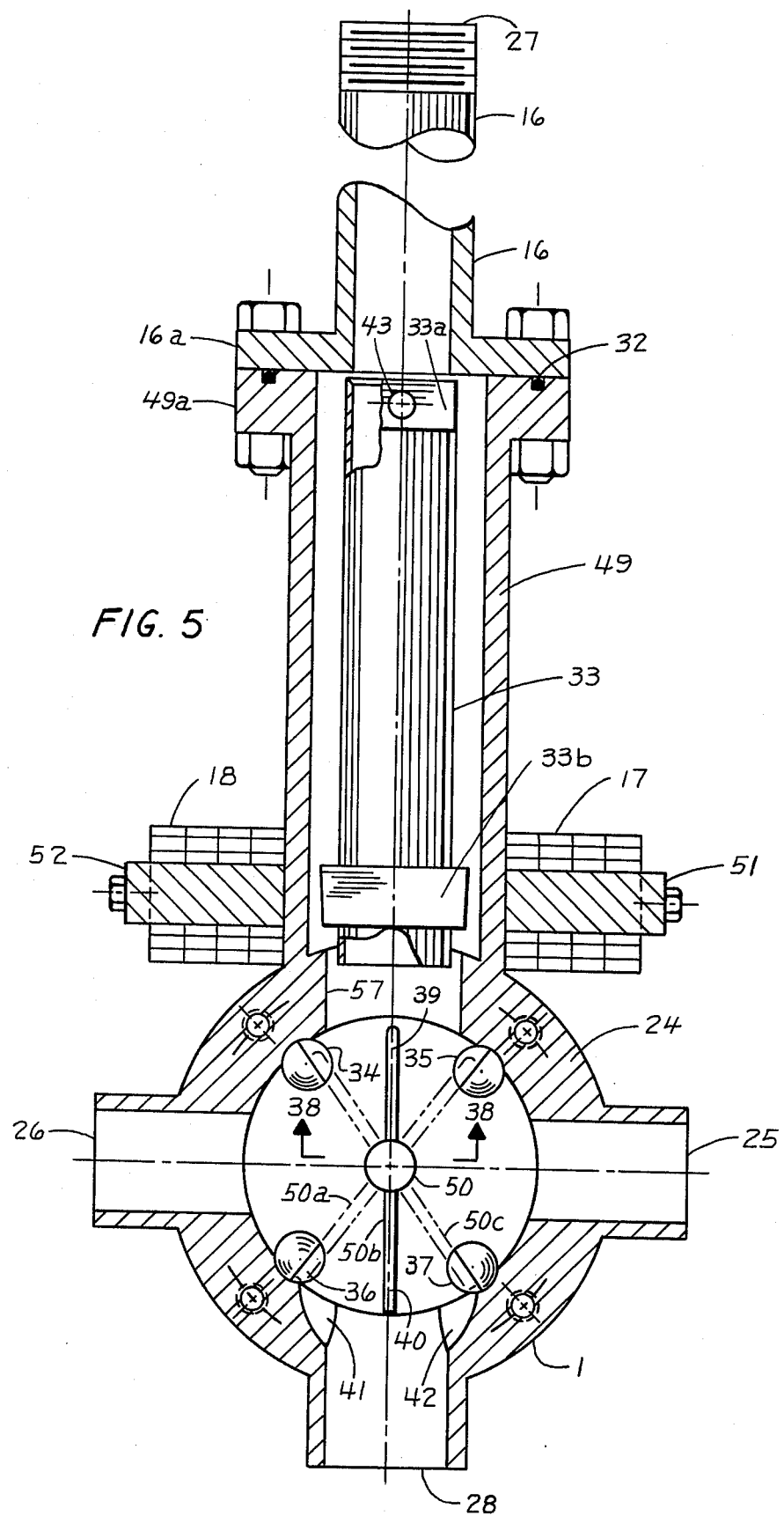
Figure 6:
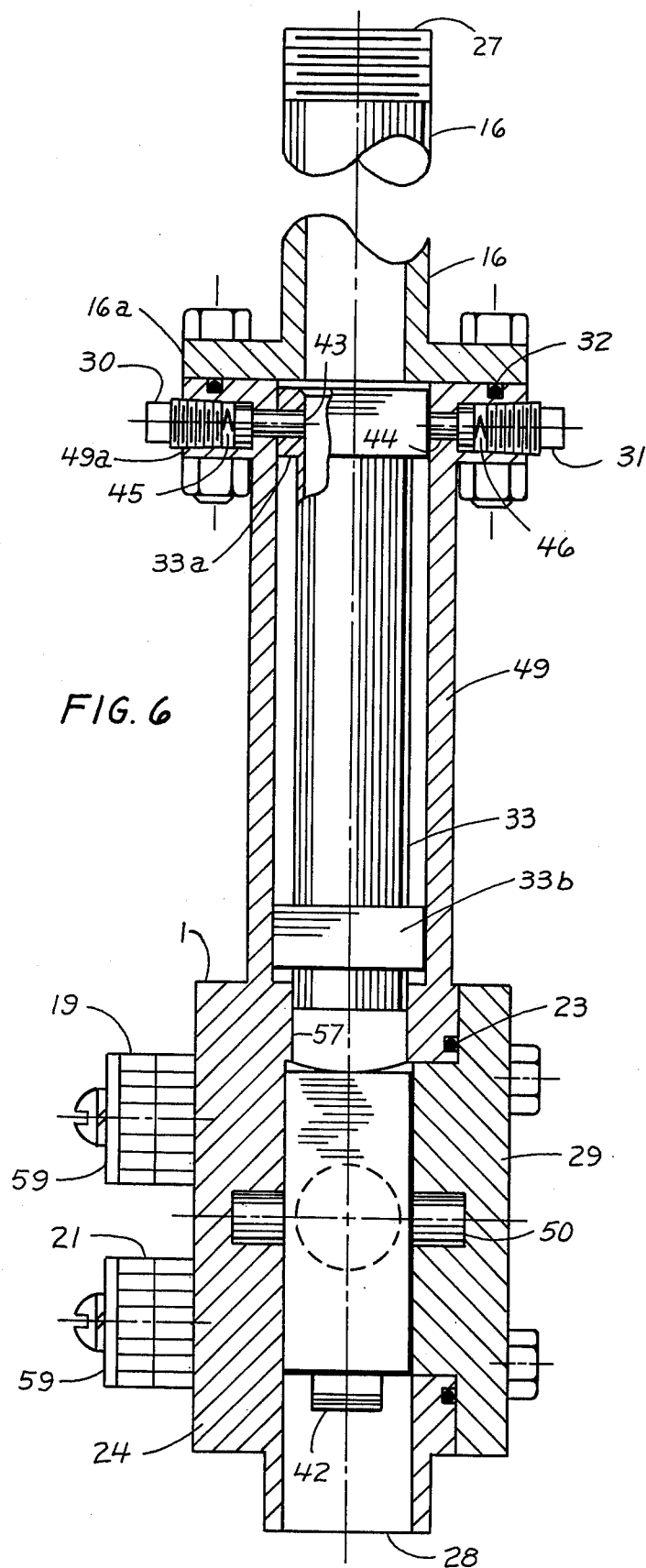
Figure 7:
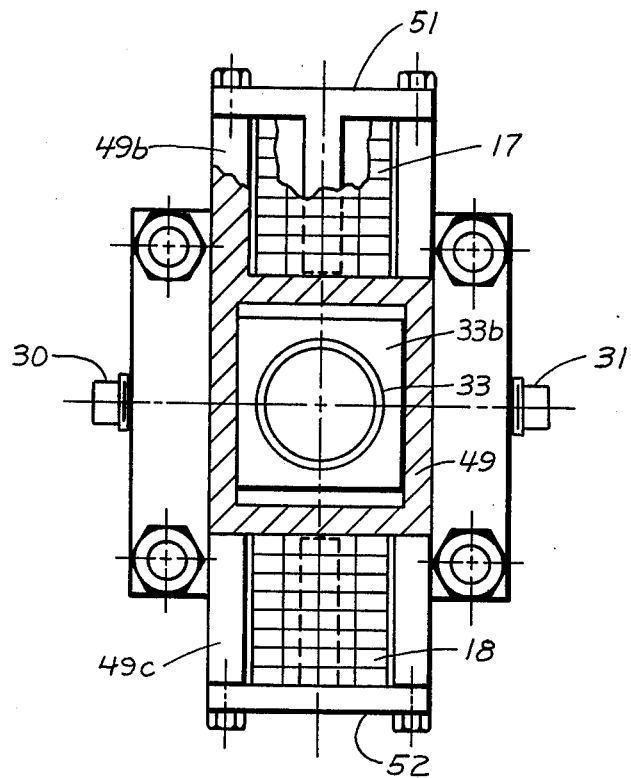
Figure 8:
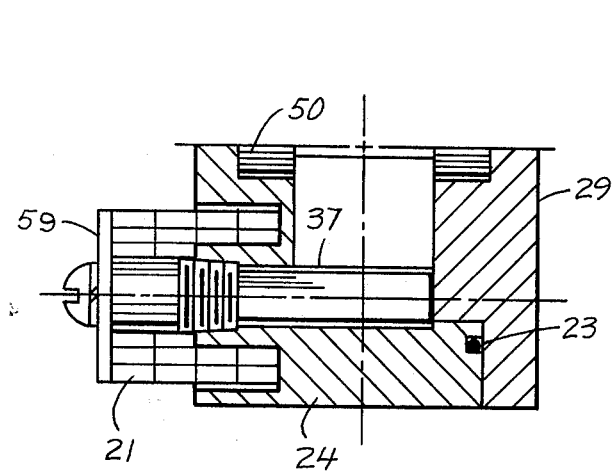
Figure 9:
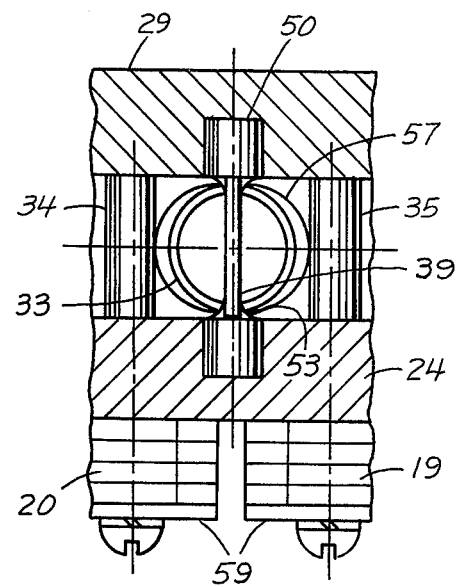

FIG. 5 is a section on line 12—12 of FIG. 3.
FIG. 6 is a section on line 14—14 of FIG. 4.
FIG. 7 is a section on line 13—13 of FIG. 3.
FIG. 8 is a section on line 15—15 of FIG. 4.
FIG. 9 is a section on line 38—38 of FIG. 5.

MECHANICAL CONSTRUCTION

The entry of the magnetic four-way valve is comprised of a straightening nozzle 16 which will reduce the turbulence of the fluid entering the valve, such a device can simply be a straight smooth run of pipe as shown in FIGS. 5 and 6. The nozzle 16 is made part of the valve by a set of bolted flanges sealed by the "o" ring 32. Of the said set of flanges the flange 49a in FIG. 6 is part the flow tube housing 49. Electromagnets 17 and 18 are attached to the bottom of said flow tube housing 49 by the combination core and cover plates 51,52. The said cover plates are bolted into the projecting lugs 49b,49c of housing 49. The flange 49a of housing 49 has two pipe plugs 30,31 projecting from it. These plugs are sealing access covers to two pivot pins 43,44, FIG. 6 and position flow tube 33 allowing said tube to swing back and forth between magnets 17,18, as FIGS. 5 and 7 more clearly indicate. The said flow tube 33 is internally a straight clear tube with a built up solid portion on the outside of the top and bottom ends. The said top end portion 33a is used to provide material for the bearing surfaces of pivot pins 43,44 and align tube 33. The said bottom end portion 33b is built up to take full advantage of the magnetic force generated by electromagnets 17,18. The top end entry to tube 33 is beveled as shown in FIG. 5. The flow tube housing 49 is connected to the vane housing 24 at the elongated, slotted port 57 FIG. 9 and communicate one to the other through said slotted port. The slotting of port 57 allows for the swinging action of flow tube 33. Vane housing 24 has three additional ports 25,26,28, FIG. 5 which allow the inside of said housing to communicate with connecting pipe lines. Port 28 has circular undercuts 41,42, FIGS. 5,6 located as shown. Vane housing 24 has four electromagnets 19,20,21 and 22, FIG. 4 attached to it by way of pipe threaded stop pins 34,35,36,37, FIGS. 5 and 8. The said stop pins communicate with the interior of vane housing 24 and are sealed into said housing with pipe threads. The said pins have a flat machined surface on their inboard portion and have electromagnets 19,20,21,22 attached to them by way of a screw and cover plate 59 FIGS. 6,9. Vane housing 24 has a solid cover 29 FIG. 6 bolted to it and is sealed by "o" ring 23. The said cover 29 and the vane housing 24 locate and support the internal vane 50 FIGS. 5,6,9. Vane 50 is a solid piece with a flat center portion and two cylindrical bearing journals one on each side. The solid connection between the flat vane surface 50a and the side journals is greatly strengthened by a full radius 53 FIG. 9 four places as shown. The upstream portion 39 of vane 50 is shorter than the downstream pottion 40. The vane 50 may be pointed or rounded on the outboard end of one or both portions 39,40. The rotating movement of said vane is limited between the flattened surfaces of stop pins 34,35,36,37. The twisting action allowed by the pipe threads of said stop pins permit the alignment of the flat surfaces of said pins to the flat surfaces of the vane 50.

PHENOMENA PERTINENT TO OPERATION

The following is a brief listing, for reference, of the natural phenomena indigenous to fluid flow that were taken advantage of in the invention of valve 1. The listed phenomena will repeatedly refer to the static and the flow condition. The valve 1 must switch and hold-in under both the static flow (maximum pressure) and the dynamic full flow condition.

- A. When a nozzle flows slightly to the side (off-center) of a rotating vane, the vane will rotate to that side in the downstream direction.
- B. A rotating vane is unstable in a flow stream and may wobble or oscillate. A vane under this unbalanced condition can easily be thrown to either side.
- C. A pipe with fluid flowing thru it tries to straighten out if curved or bent.
- D. When a moving body is stopped it needs a certain amount of space to de-accelerate, as would a rotating vane overshoot the center position it seeks in a flow stream.
- E. If a rotating vane doesn't have a locationally perfect center of rotation, the longer vane end will tend to move away from a uniformly applied force and will seek a position that is ultimately parallel to flow.
- F. The momentum of a moving fluid generates a force on surfaces that would change the direction or velocity of the fluid.

OPERATION

When power is supplied to the FIG. 1 system, the valve 1 FIG. 4 will become activated thru either electrical lines 47 or 48. Let us arbitrarily say that the controls have chosen line 47 in which case electromagnets 17,19, and 22 will become energized. By this time pump 2 FIG. 1 is supplying fluid flow to the inflow port 27 of valve 1. The fluid passes from the straightening nozzle 16 to the flow nozzle 33 forcing the flow nozzle 16 to seek the center position shown in FIG. 5 in response to natural phenomena C. The fluid passes from the said nozzle into the vane housing 24 where it will impinge on vane 50 and leave the valve 1 by way of port 28. No flow will take place thru ports 25 and 26 because in FIG. 1 said ports are ultimately the entry a and exit of a closed loop. An equal pressure at the entry and exit of such a closed loop will cancel out and will result in no fluid flow in the loop. Electromagnet 17 attracts flow nozzle 33 pulling it in from the central position to the extreme right side. The fluid discharging from the newly positioned nozzle 33 easily rotates unstable vane 50 (see phenomenon B) in a CW direction in response to phenomenon A. When vane 50 approaches stop pins 36 and 35 magnetic fields developed by electromagnets 19 and 22 quickly snap in said vane and hold it against said pins 36 and 35 with force sufficient to overcome the static force explained in phenomenon E. The vane, now in position 50a, delivers fluid to port 26 and channels returning fluid from port 25 to port 28. When electric power switches from control line 47 to 48, electromagnets 17,19,22 will become de-energized. The de-energization of electromagnet 17 will allow nozzle 33 to swing towards center in submission to phenomenon C and overshoot center in obeyance of phenomenon D where said nozzle will be snapped home by the influence of the now energized complementary electromagnet 18. The de-energization of electromagnets 20,21 will allow vane 50 to seek the center position in submission to phenomenon E. When vane 50 starts to open, fluid will rush between the vane and stop pin 36 FIG. 5 and the vane will snap back to the said pin and come and go at this point due to phenomena F and E. The undercut 41 will produce an equal and opposite flow force on vane 50 cancelling out the effect of phenomenon F altogether and allowing phenomenon E to take command forcing the said vane towards center position 50b. The vane will be greatly accelerated by the combined effects of phenomena A and D and will be snapped home against stop pins 34,37, by the effect of the now energized complementary electromagnets 19 and 22. With vane 50 in position 50c fluid will be delivered thru port 25 and returned thru port 26 to port 28 and back to the pump 2 of FIG. 1. When port 25 and 26 are flip-flopped from supply to return and back again by the vane 50, the piston 58 in cylinder 3 will move back and forth along the axis of the cylinder 3 in a matched response as is apparent from studying the arrowed flow paths in FIG. 1.

The valve 1 in three-way operation is shown by FIG. 2 controlling the tank 6 level. The fluid is supplied to the tank 6 thru line 8. The fluid is pumped from the tank 6 to the valve 1 by pump 2. The valve 1 then may deliver the fluid to process thru line 10 or recycle it back to the tank 6 thru recycle line 9. This action will hold tank 6 level without the necessity of the pump 2 starting and stopping. The choice of delivery points of said valve 1 is controlled by the level controller 7. Line 11 is an equalization line that is necessary for the switching operation of valve 1. Line 11 will always provide lower pressure on the non-fluid supplying side of vane 50 (see FIG. 5) thru check valves 4 and 5. The internal operation of valve 1 FIG. 2 is exactly the same as discribed in the FIG. 1 operation.

The four-way valve replaces the four-way valve 11, the solenoids 14,22, the pilot valve 19 and the hydraulic operator 37 of my U.S. Pat. No. 3,976,401, incorporated by reference.

I claim:

1. A four-way electromagnetically controlled valve having a vane housing with a plurality of exit ports and an internal rotating vane for switching the flow from one exit port to another exit port, a pivoting flow nozzle, electromagnet means for pivoting the flow nozzle from side to side, the fluid discharge of the said pivoting nozzle turning said rotating vane, a stop means for holding the vane in final fluid delivery position, and electromagnets for holding the vane against said stop means.

2. The valve of claim 1 in which the valve has a fluid tight envelope that hermetically seals out the outside environment and seals in the internal fluid.

3. The valve of claim 1 in which the rotating vane has cylindrical bearing journals and is constructed for strength and streamlined effect, great strength is derived from a full radius between the vane proper and the cylindrical bearing journals of the vane, making it possible to have a flat streamlined vane without material failure.

4. The valve of claim 1 in which there is an undercut at a location between each fluid exit port and each extreme position of the downstream vane tip.

5. The valve of claim 1 in which there is a flow straightening tube connected to the inlet of the flow nozzle and the connection between the flow straightening tube and the flow nozzle housing is a flanged "O" ring connection that will allow easy radial and axial alignment of said straightening tube and flow nozzle.

6. The valve of claim 1 in which the stop means are pins and the rotating vane has flat surfaces engaging the stop pins and the vane stop pins have a flattened surface on their inboard portion allowing for greater magnetic hold-in attraction between the flat surface of said pins and the flat surface of the rotating vane.

7. The valve of claim 6 in which the stop pins are connected thru the vane housing with pipe threads allowing for a positive seal and the rotating alignment of the flat surfaces of said pins to the flat surfaces of the rotating vane.

8. The valve of claim 1 in which the vane is in a housing having a cover and the connection between the vane housing and the cover of the vane housing is a flanged "O" ring connection allowing for a toleranced fit axially and radially between these two mating parts.

9. The valve of claim 1 in which the nozzle is pivoted by pins and said pins are covered by pipe plugs which are inherently self-sealing and hold in the said pivot pins with the assistance of gap take-up springs.

10. A four way valve having an inlet and three outlets, one of the outlets being a return opposite the inlet and the other two outlets being on either side of the return and internal means actuated by liquid flow for switching the flow from the inlet to any one of the three outlets, a pivoted nozzle carrying the liquid to be controlled directing liquid against said switching means for controlling said switching means, and means for pivoting said nozzle.

11. The valve of claim 10 in which the switching means is a vane in the stream of liquid flowing from the inlet to said return.

12. The valve of claim 11 in which the vane is movable from a central position in the stream of liquid flowing to said return to positions on one and the other side of said central position for deflecting the liquid respectively to one and the other of the remaining outlets.

13. The valve of claim 12 in which the vane in said one and other positions bleeds some liquid to said return.

14. The valve of claim 13 in which electromagnetic means hold the vane in said one and said other positions.

* * * * *